United States Patent [19]

Kamm

[11] 4,446,747
[45] May 8, 1984

[54] METHOD AND APPARATUS FOR TESTING LIP PRESSURE APPLIED TO A SMOKING ARTICLE AND FOR CALIBRATING THE PRESSURE TESTING APPARATUS

[76] Inventor: Roger D. Kamm, 77 Marion Rd., Watertown, Mass. 02172

[21] Appl. No.: 356,979

[22] Filed: Mar. 11, 1982

[51] Int. Cl.³ .............................................. G01L 1/02
[52] U.S. Cl. .................................. 73/862.58; 73/706
[58] Field of Search .............. 73/862.58, 706, 729, 73/731, 715, 730, 84, 37

[56] References Cited

U.S. PATENT DOCUMENTS 4,312,361  1/1982  Nicholson et al. ............... 73/731 X Primary Examiner—Jerry W. Myracle
Attorney, Agent, or Firm—Kane, Dalsimer, Kane, Sullivan and Kurucz

[57] ABSTRACT

A method and apparatus for testing pressure applied to a smoking article is provided and is particularly useful in testing lip pressure applied to cigarettes. The system includes a pressure sensor adapted to be positioned on a predetermined portion of the smoking article that is to be subjected to external pressure. A pressure transducer is connected to the sensor. The output of the transducer responsive to the pressure applied to the smoking article and sensed by the sensor is displayed. Additionally, a method and apparatus for calibrating the pressure sensor is included. The calibration system includes a rigid enclosure and an elastomeric tube positioned in a recess in the enclosure and connected to a pressure regulator. The enclosure includes a recess conforming to the configuration of the smoking article with a pressure sensor mounted thereon and positioned so that the smoking article in the recess is in communication with the elastomeric tube so that when the tube is pressurized it exerts a measured contact stress on the smoking article and pressure sensor. Thus, the calibration can take place over a range of anticipated pressures.

15 Claims, 9 Drawing Figures

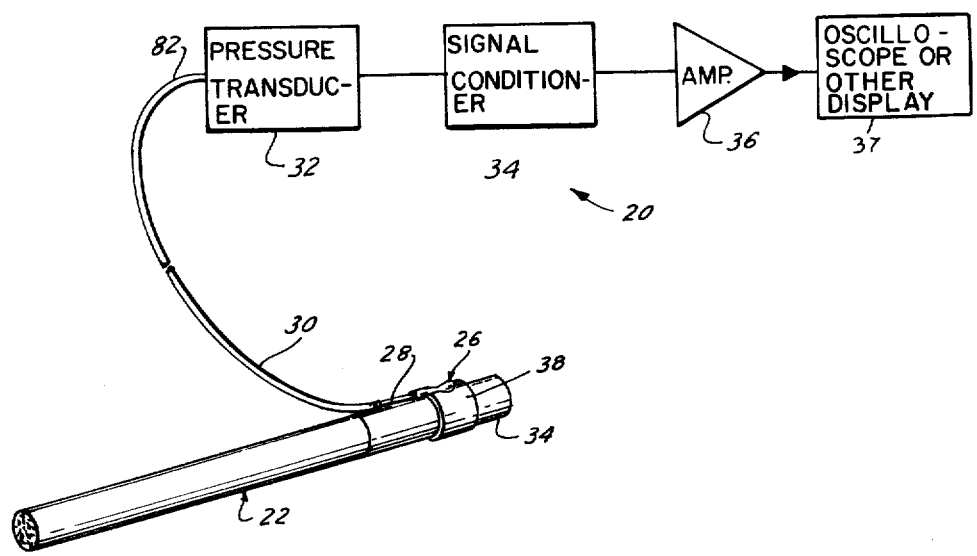
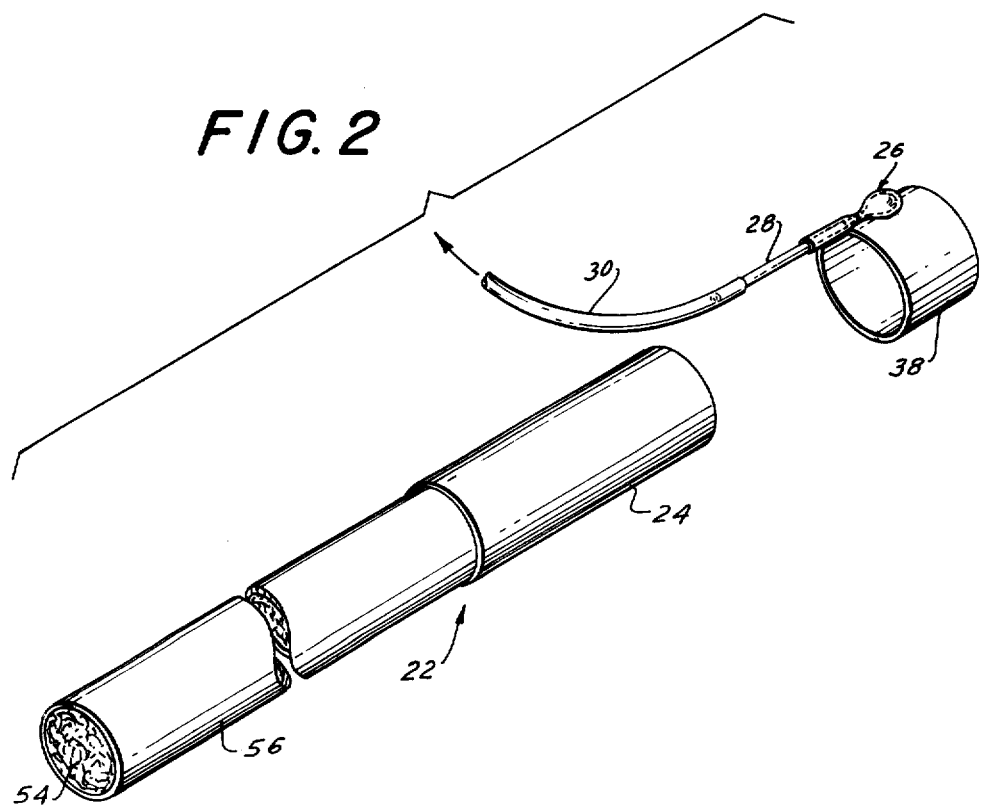

☐ NORMAL PUFFS
▨ LIGHTING

METHOD AND APPARATUS FOR TESTING LIP PRESSURE APPLIED TO A SMOKING ARTICLE AND FOR CALIBRATING THE PRESSURE TESTING APPARATUS

BACKGROUND OF THE INVENTION

In dealing with smoking articles, for example, cigarettes, it is occasionally desirable to determine the pressure exerted externally on the smoking article during the actual smoking process. This is to monitor any effect that the pressure exerted on the smoking article, particularly cigarettes, might have on the passage of the smoke through the tobacco rod.

For instance, in smoking filter cigarettes, the filter element is normally held within the smoker's lips and a certain amount of pressure is exerted during the lighting and smoking procedures. This pressure could have no effect or a varied range of effects on passageway through the filter and the smoke passing through the cigarette to the mouth of the smoker.

Since the existence of at least some lip pressure is present when a cigarette is being smoked, it is extremely helpful to determine the parameters of the effect the lip pressure has on the cigarette, particularly the filter element, during the smoking process.

Accordingly, a pressure measuring system for determining and analyzing the pressures applied to the smoking article are of great value in research and development in present day tobacco technology. The apparatus and method of the system should be adaptable for use with determination of various type of external pressures such as lip pressure or, alternatively, the pressure exerted by a range of well known filter holders.

Naturally it would be advantageous to provide a system which is low cost in design and is easy, efficient and accurate to use.

A pressure testing apparatus that can be repeatedly used also results in savings in time, materials and other common cost factors.

Similarly, the pressure sensing device should be one which can be easily calibrated and for this purpose, it would be helpful to provide an inexpensive, accurate, easy and efficiently operated calibration system for preparing the testing apparatus for use on smoking articles such as cigarettes.

SUMMARY OF THE INVENTION

With the above background in mind, it is among the primary objectives of the present invention to provide a method and apparatus for testing pressure applied to a smoking article, for example, lip pressure applied to a cigarette. The system is manufactured at low cost and operates efficiently.

A further objective of the present invention is to provide a method and apparatus for calibrating the pressure testing apparatus prior to each use or prior to repeated uses.

A further objective is to provide an apparatus for pressure testing which can be applied to individual smoking articles or be reused and applied to successive smoking articles.

In one form, the apparatus includes a test probe or sensor which is affixed to the smoking article such as the filter tip of the cigarette. The sensor is interconnected with a transducer by means of a tubular arrangement so that fluid can be introduced through the tubular arrangement and into the sensor which is in the form of an elastomeric bulb to inflate the bulb. Thereafter, pressure applied to the bulb, such as by lip pressure or a cigarette holder, will cause the fluid in the bulb and tubular arrangement to react and cause the transducer to respond. The output of the transducer is appropriately amplified and displayed, for example, on an oscilloscope.

It is contemplated that the bulb or sensor be placed in position to be contacted by the lips of the user or by a filter holder commonly available on the market. The system is designed for use with smoking articles such as filter tip cigarettes whereby the effect on the smoke flow through the filter can be analyzed with respect to the effect of pressure on the exterior filter during use.

The tubing takes the form of a predetermined length of stainless steel needle tubing, open at both ends, and having the elastomeric bulb, for example of latex rubber mounted on one end and a length of tubing frictionally mounted on the other end so that fluid communication is present through the tubing, the needle and the bulb. The other end of the tubing, which may be Teflon or similar material, is connected to the transducer.

It is preferable to use liquid such as water as the fluid in the sensing apparatus since the relative incompressability of the liquid is preferred over a more compressible gas. The result is better accuracy in the testing apparatus.

The testing apparatus can be affixed in a conventional manner such as by use of a common adhesive or epoxy. For example, the metal cannula can be easily bonded to the surface of the smoking article.

It is a further objective to provide a second form of the pressure testing apparatus which is designed for reuse on a successive number of smoking articles. Instead of affixing each individual testing apparatus to a smoking article, the bulb is mounted on a band which can be circumferentially positioned about the end of the smoking article. To assist in retaining the band on the smoking article, the band is formed of an elastomeric material such as latex rubber that is slightly expanded to engage smoking article and is then released so it will tend to compress hold on the smoking article. Naturally the elastomeric band can be expanded and removed after use and reused with another smoking article. In this manner a whole group of articles can be tested with a single testing apparatus.

Calibration of the apparatus is desirable for accuracy of the test results. This is true whether the apparatus is to be used a single time or a number of times. If it is to be reused, calibration should take place at least before the first use. The calibration apparatus and method includes a rigid enclosure having an elastomeric tube connected to a source of pressure. The housing contains a second recess for introduction of a smoking article positioned so that the smoking article and sensor positioned thereon are in communication with the tube in the enclosure. Expansion of the tube by a predetermined amount of pressure will provide calibration for a range of anticipated pressures. It is an objective to provide a low cost calibration system that is easy and efficient to use.

The calibration system includes a thin walled latex tube mounted within a rigid Plexiglas enclosure. The geometry can be designed for close resemblance to the ultimate application of pressure, for example lip configuration. Pressure to the calibration device is controlled by a conventional pressure regulator and is measured by a mercury manometer. When pressurized, the elastomeric tube exerts a measured contact stress on the smoking article, such as a cigarette filter.

The enclosure is formed of a pair of mating plates. At least one of the plates has a recess with a configuration to receive the elastomeric tubes therein when the plates are mated. A second recess communicating with the first recess is in at least one of the plates and is provided with a configuration to receive the smoking article when the plates are mated. The two communicating recesses result in communication between the smoking article and the elastomeric tube so that pressure applied to the tube will be applied to the smoking article.

In summary, an apparatus and method is provided for testing pressure applied to a smoking article. The system includes a pressure sensor adapted to be positioned on a predetermined portion of a smoking article to be subjected to external pressure. A pressure transducer is connected to the sensor. Means is connected to the transducer to indicate the output of the transducer responsive to the pressure applied to the smoking article and sensed by the sensor.

A calibration apparatus and method is provided for calibrating the pressure testing apparatus. The calibration system includes a rigid enclosure housing an elastomeric tube connected to a source of pressure. A recess is in the enclosure to receive a smoking article therein in communication with the tube. Thus, when pressure is applied to the tube it will be transmitted to the smoking article and permits the calibration of the smoking article containing a pressure sensing sensor thereon over a range of anticipated pressures prior to use.

With the above objectives among others in mind, reference is made to the attached drawings.

BRIEF DESCRIPTION OF THE DRAWINGS

In the drawings:

FIG. 1 is a schematic view of the pressure testing apparatus of the invention attached to a filter cigarette;

FIG. 2 is a fragmentary prospective view of the pressure testing apparatus removed from the filter cigarette;

DETAILED DESCRIPTION

Figure 3:
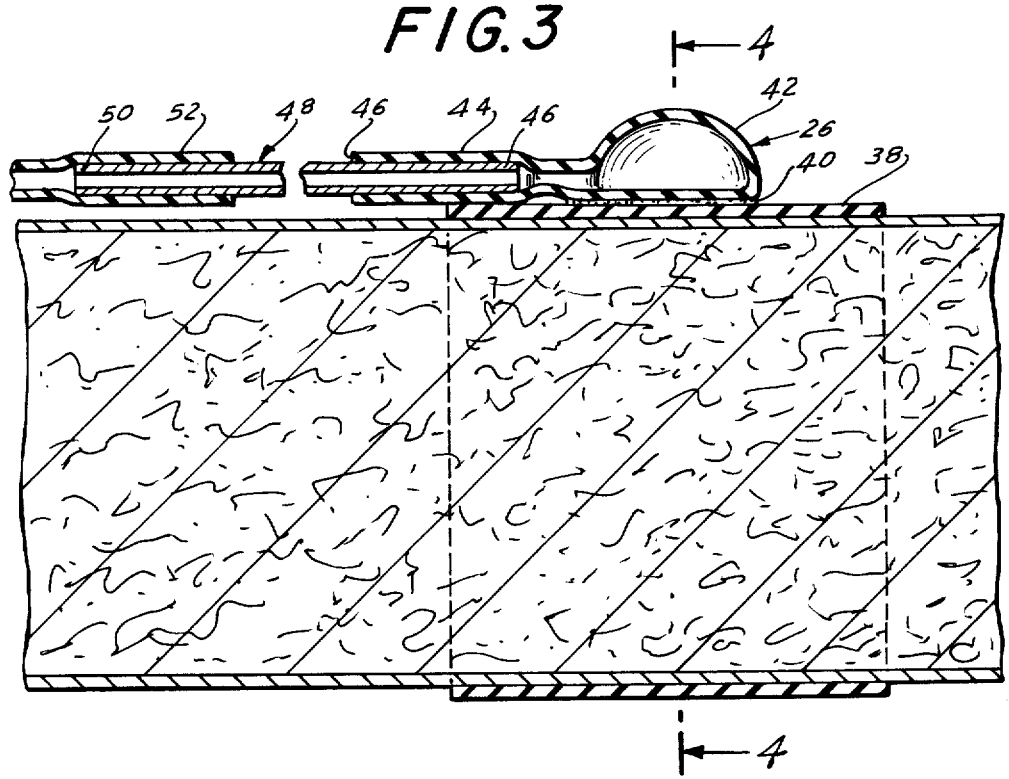
FIG. 3 is an enlarged fragmentary sectional view of the pressure testing apparatus mounted on a filter cigarette.
Figure 4:
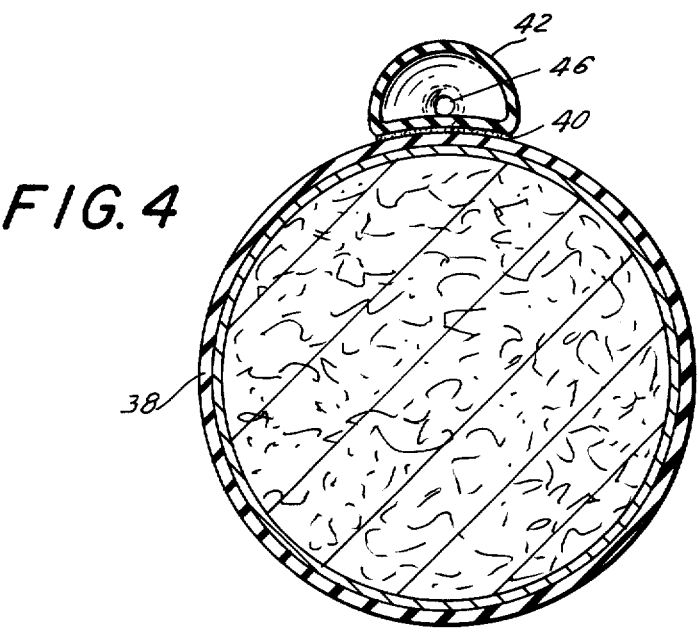
FIG. 4 is a sectional elevation view thereof taken along the plane of line IV—IV of FIG. 3.

The pressure testing apparatus 20 is shown in schematic form in FIG. 1 attached to a smoking article, in this case a cigarette 22 having a filter tip 24. Apparatus 20 include an elastomeric sensor bulb 26 attached to a substantially rigid non-expandible section of metal needle tubing 28. The other end of the needle tubing 28 is connected to a flexible but substantially non-expandible length of catheter tubing 30. The catheter tubing is connected to a pressure transducer 32. The output of the pressure transducer 32 is directed to a signal conditioner 34 and then to a low noise amplifier 36. From that point the output is directed to a display mechanism such as a conventional oscilloscope 37. The transducer, signal conditioner, amplifier, oscilliscope are all common well known commercially available products.

Sensor 26 is affixed in a conventional manner such as by bonding with adhesive to an elastomeric mounting band 38. The mounting band 38 is designed to be slightly expanded and to frictionally engage the exterior surface of the filter portion 24 of cigarette 22. In this manner, pressure testing apparatus 20 can be used on a successive number of cigarettes for testing purposes.

In use, as shown in FIGS. 1–4, circumferential band 38 is hollow and is dimensioned to be slightly smaller in relaxed condition than the outer surface of filter tip 24 of cigarette 22. Thus, the band is expanded slightly and inserted over filter tip 24 at the approximate location where a smoker would engage the filter tip with his lips. Band 38 is then released and its tendency to return to the relaxed condition will cause it to frictionally engage the filter tip. The pressure sensing apparatus 20 is then in position for use. Sensor 26 is affixed to the exterior surface of the band 38 by bonding with adhesive or any common well known conventional alternative attachment means. Sensor 26 includes an enlarged elastomeric bulb portion 42 and extending narrower diameter neck portion 44 terminating in an open end 46. One end 48 of a piece of needle tubing 48 extends through open end 46 and slightly expands elastomeric neck portion 44 so that there is frictional engagement therebetween.

The other end 50 of needle tubing 48 extends into the open end portion 52 of catheter tubing 30. End portion 52 is again slightly expanded and is of resilient material so that it frictionally engages with end portion 50. The other end 54 of catheter tubing 30 is connected to transducer 32 so that its hollow interior directly communicates with the transducer. In this condition, there is a fluid passage way between the transducer and the bulb 26 through the communicating hollow interiors of catheter tubing 30, needle tubing 48 and sensor 26. This interconnected fluid passage way is filled with a suitable fluid, preferably a liquid such as water, which is relatively non-compressible so that fluid pressure applied to the bulb 42 will be transmitted to the fluid inside the bulb and directly to the transducer to provide an accurate pressure reading.

As an alternative, if it is desired to only use the pressure testing system 20 one time for a single cigarette 22, band 38 can be dispensed with and either sensor 26 or needle tubing 48 can be directly affixed to the cigarette by a suitable adhesive or other conventional means to prepare for the testing procedure. Naturally, by affixing system 20 directly to a single cigarette 22, it cannot be removed and reused with further cigarettes.

The depicted cigarette 22 is conventionally formed of a rod of tobacco material 54 encased in a wrapper 56. The tobacco rod 54 abuts filter 24 which is filled with suitable tobacco smoke filtering medium.

Figure 7:
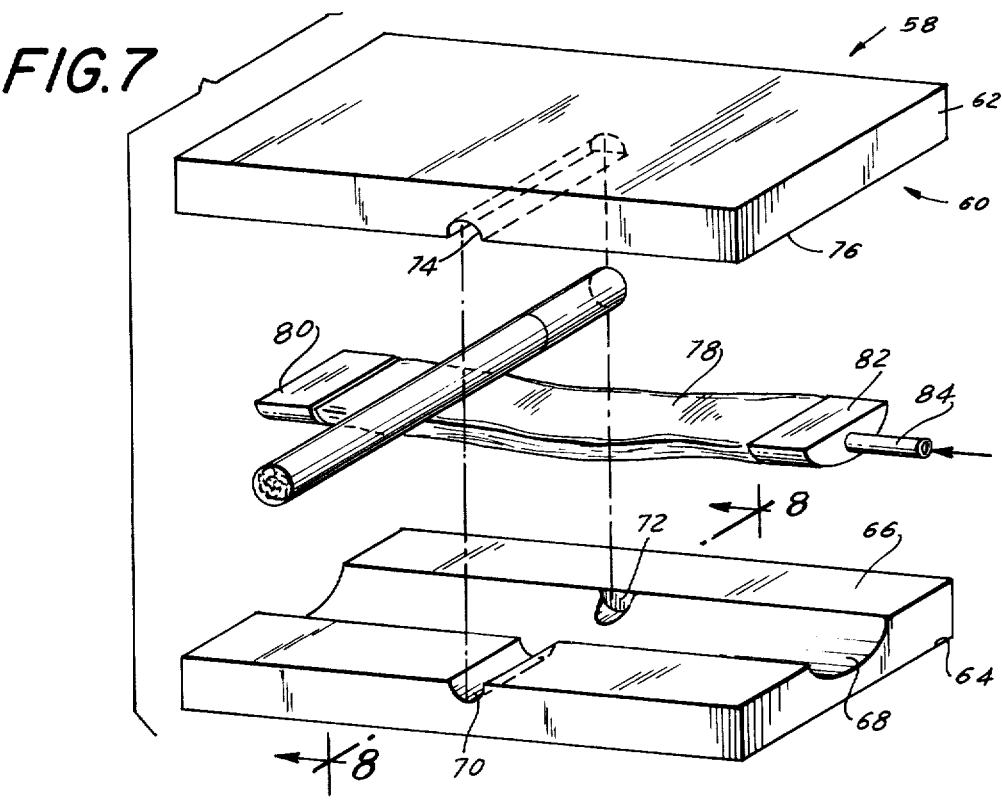
FIG. 7 is an exploded perspective view of the calibration apparatus for calibrating the pressure testing apparatus of the invention.
Figure 8:
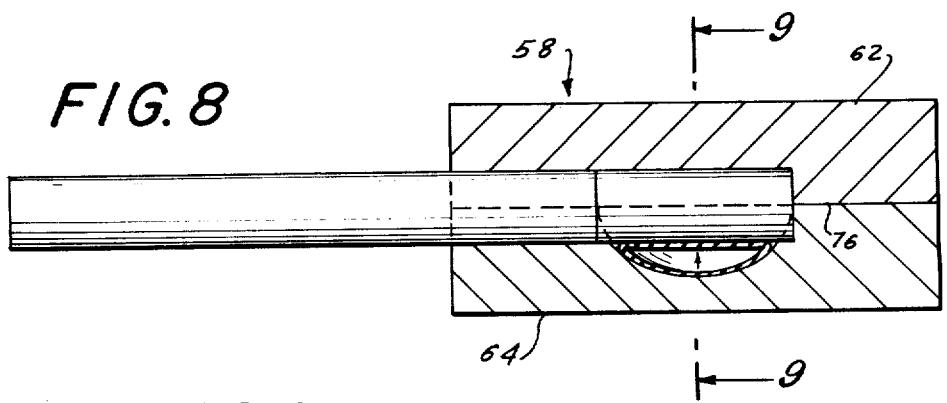
FIG. 8 is a sectional end view thereof taken along the plane of line VIII—VIII of FIG. 7.
Figure 9:
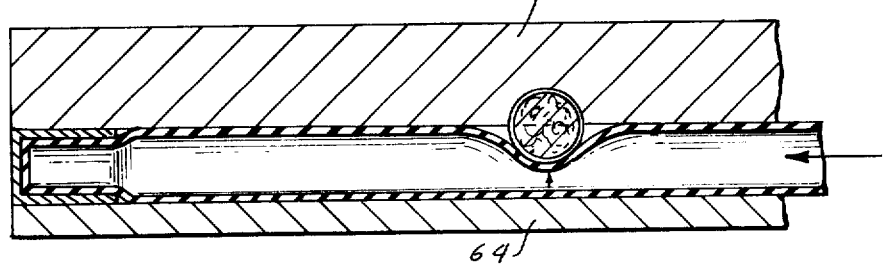
FIG. 9 is a fragmentary sectional longitudinal view thereof taken along the plane of line IX—IX of FIG. 8.

FIGS. 7–9 show the calibration system 58 designed for calibrating the assembly of FIGS. 1–4 prior to use by a smoker.

The calibration apparatus includes a rigid enclosure 60 comprises a pair of mating plates, a top plate 62 and a bottom plate 64. The plates 62 and 64 are substantially rectangular in configuration as a matter of choice. The inner face 66 of bottom plate 64 is provided with a longitudinal arcuate recess 68 along its central portion from end to end. It also includes a pair of transverse recesses 70 and 72 intersecting the longitudinal recess 94 and together positioned to mate with a transverse arcuate recess 74 in the under surface 76 of upper plate 62. Transverse recesses 70, 72 and 74 are arcuate in configuration and mate to substantially conform with the outer surface of the cigarette 22 with the pressure sensor 26 mounted thereon.

Recesses 70 and 74 are opened to the lateral edge of plates 64 and 62 respectively so that a cigarette positioned in the mating recesses 70, 72 and 74 will extend outwardly therefrom transverse to the longitudinal direction of the mating plates of enclosure 62.

Positioned in longitudinal recess 68 is an elongated elastomeric tube 78 affixed at one end to a rigid end clamp 80 and at the other end to a second rigid end clamp 82. An entry tube 84 extends into elongated tube 78 through end clamp 82. The other end of connecting tube 84 is affixed to a control source of pressure (not shown).

In use, plates 62 and 64 are displaced from one another, elongated elastomeric tube 78 is positioned in recess 68 and a cigarette 22 is positioned in aligned recesses 70 and 72. The end of cigarette 22 containing filter 24 and sensor bulb 26 is positioned in recesses 70 and 72 and the remainder of the cigarette extends outwardly from plate 64 as shown in FIG. 8. Top plate 62 is then mated with plate 64 so that recess 74 combines with recesses 70 and 72 to capture the filter end portion of cigarette 22 as if a smoker's lips have engaged the filter tip or a filter holder has engaged the filter tip.

Pressure can then be applied through introducing tube 84 to expand elongated elastomeric tube 78. This pressure is transmitted directly to communicating filter tip 24 and sensor bulb 26 mounted thereon as shown in FIG. 9. By changing the introducing pressures to elongated tube 74, the pressure testing system 20 can be calibrated for a wide range of pressures.

After completion of the calibration procedure, the plates 62 and 64 can be displaced from one another and the cigarette and attached sensor can be removed for actual use by a smoker to obtain the desired pressure results. The frequency of repetition of calibration is a matter of choice. The arrangement can be calibrated before the first use in a series of uses of apparatus 20 or before each successive use for successive cigarettes.

The overall system 20 is designed for determining pressures exerted on the surface of a smoking article, such as a filter cigarette by either human lips or in normal smoking conditions or by a variety of different types of commercial filter holders. Measurement of surface pressure on a small portion of the filter surface requires a special measurement technique. In this technique, a small, very compliant elastomeric bulb or sensor is attached to the cigarette surface and is connected by means of stiff tubing to a low compliance pressure transducer. This entire system, the bulb, tubing and transducer, is filled with water to minimize the change in volume of the elastomeric bulb during compression.

When lips or a filter holder come in contact with the bulb 42, the external forces cause pressure inside the bulb to rise. As long as bulb 42 remains partially inflated, the pressure sensed by the transducer 32 reflects the pressure applied to the bulb surface. Due to the low compliance of the water-filled system, the contained volume of bulb 42 changes very little, even for surface pressures approaching 500 torr. Since the test probe is so small, the normal contour of the lips and of the filter holders is minimally affected.

Elastomeric sensor 26 is formed of a commercially available material such as latex rubber and has a diameter of approximately 1-2 mm. It is secured by contact adhesive 40 to small elastomeric band 38, also of latex rubber, which is attached to a small portion of cigarette 22, approximately 2 mm. in length and approximately 7-9 mm. from the end of the filter tip 32 distal from the tobacco end of the cigarette.

Neck portion 44 slides over the end of a 1 cm. length of 22 gage hypodermic needle tubing 48. Needle tubing 48 is attached to a 2 ft. length of Teflon catheter, approximately 1 mm. in inner diameter, which leads to the low compliance ($10^{-9}$ cm$^3$/dyne/cm$^2$) pressure transducer (Gould Statham P 23 Series). The output of transducer 32 is amplified using a variable gain low-noise amplifier and displayed on an oscilliscope.

Because the bulb has a non-linear response to contact pressure, it is desirable to calibrate instrumented cigarettes. This is accomplished by use of calibration system 58 which includes the elastomeric tube 78 mounted within the rigid enclosure 60. Tube 78 can be formed of conventional material such as thin-walled latex rubber. Similarly, enclosure 60 can be formed of conventional material such as Plexiglas. The geometry of the apparatus 58 is chosen for its close resemblance to a smoker's lip configuration. Pressure to the calibration device 60 through introducer tube 84 is controlled using a 10 psig pressure regulator and measured by a mercury manometer. When pressurized, tube 78 exerts a measured contact stress on a cigarette filter 24 held between plates 62 and 64. The combined cigarette filter and attached sensor are calibrated over the range of anticipated pressures.

Testing apparatus 20 has been used successfully in the cigarette industry to conduct and obtain pressure results for lip pressure and pressures obtained by using several different types of commercially available filter holders.

In regard to holders, for filter holder 1 commercially known as the Cambridge holder, a latex sheet was used in accordance with the industry's standard, 0.20-023 mm. thick with a 3 mm. diameter hole. When stretched on to the holder, the latex hole diameter increased to 3.9 mm. For filter holder 2 commercially known as the Borgwaldt holder, a standard latex rubber sleeve was used which has a 7 mm. outer diameter with a wall thickness of 0.36-0.43 mm. For filter holder 3 commercially known as the Filtrona holder, a latex sleeve of 6 mm outside diameter and 0.38 mm wall thickness was used.

In each case, several pressure measurements were made at or near the position of peak pressure. The average values of pressure determined for each series of measurements, as shown in FIG. 6, was 47 torr for filter holder 1, 118 torr for filter holder 2 and 500 torr for filter 3.

For human lip pressure, prior to each test, a sensor was mounted on a fresh cigarette and calibrated over a range of anticipated pressures, typically up to 250 torr. When the cigarette was calibrated, a smoker inserted the cigarette so that the sensor was centered on the lip and the cigarette was smoked in a normal fashion at a normal pace. The first group of smokers were asked to smoke with the bulb against the top lip for the first 3 to 5 puffs and then against the bottom lip for the remaining 3 to 5 puffs. In the next group of tests, to balance the results, the procedure was reversed and a smoker first engaged the bottom lip and then the top lip.

Figure 5:
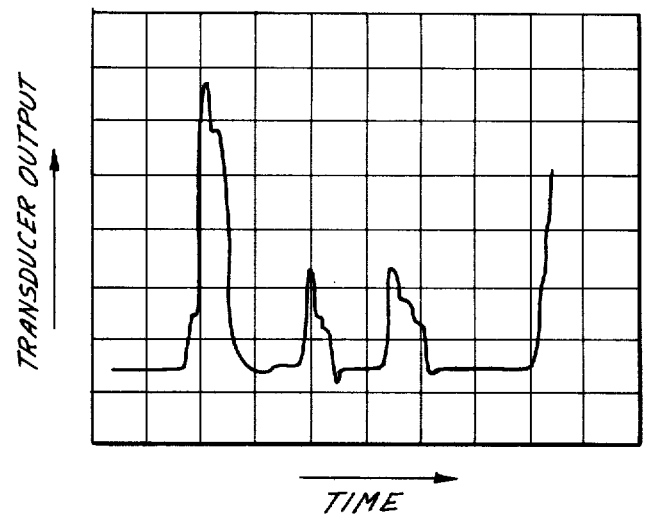
FIG. 5 is a graphic display of the sensed pressures of the apparatus over a period of time.

For each puff, the pressure excursions were observed on an oscilliscope screen and the peak excursion during each puff was recorded. Each individual had a typical pressure trace, the shape of which was fairly consistent. Typically, the pressure would rise rapidly to a first maximum as the lips contacted the probe, then fall to a lower value, then rise to a second maximum before falling to zero. This general pattern can be seen in the sample traces depicted in FIG. 5.

Figure 6:
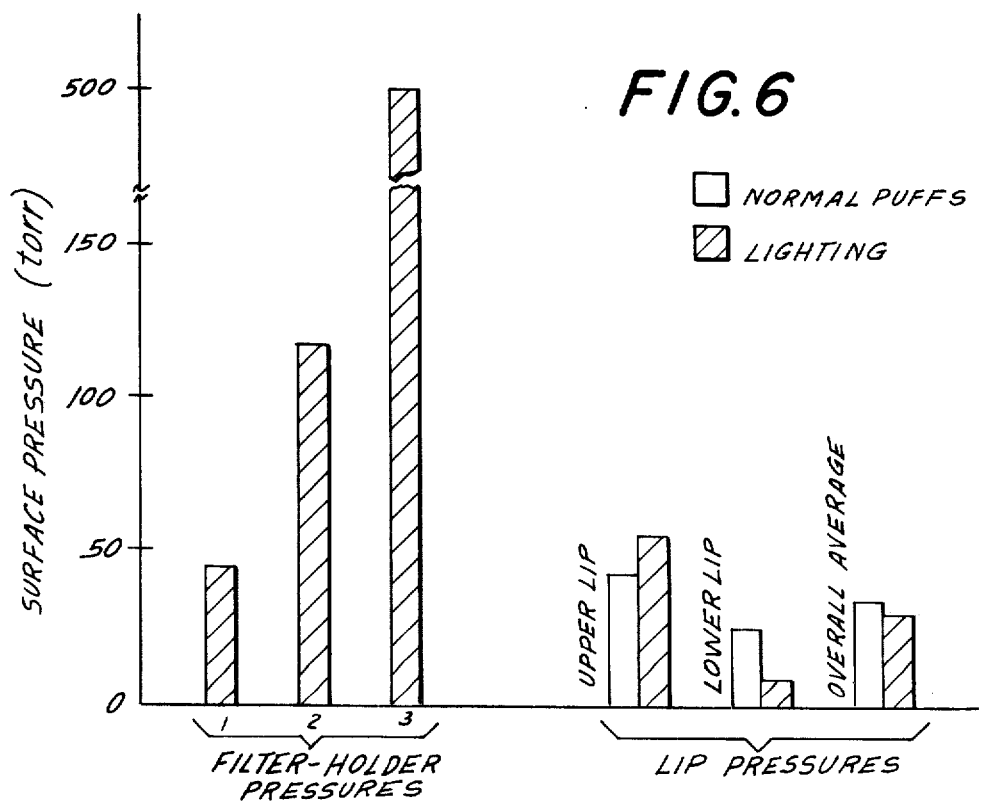
FIG. 6 is a graphic representation of the relative pressure differentials of lip pressure and filter holder pressure on a filter cigarette using the pressure testing apparatus of the invention.

A graphic representation of the test results is shown in FIG. 6 including the pressures exterted in each of the three filter holders tested. As seen in the Figure, holder 1 exerted pressures only slightly higher than the mean lip pressure, holder two exerted a pressure about 3.5 times as great and holder 3 provided a surface pressure 15 times as great. Among the three filter holders tested, holder 1 most closely approximated the pressure level produced by human lips.

The parameters including dimensions in materials for the pressure testing and calibration apparatus of the present invention are a matter of choice as long as they conform to the general arrangement as described above in connection with the depicted embodiment.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. Apparatus for testing pressure applied to a smoking article comprising; a pressure sensor intended to be positioned on a predetermined portion of a smoking article to be subjected to external pressure, means for holding said sensor on the smoking article, a pressure transducer connected to the sensor, and means connected to the transducer to indicate the output of the transducer responsive to the pressure applied to the smoking article and sensed by the sensor.

2. The invention in accordance with claim 1 wherein the external pressure is applied by one of smoker's lip pressure and filter holder pressure.

3. The invention in accordance with claim 1 wherein the sensor includes an elastomeric bulb and a connecting tube assembly, the assembly being affixed to the smoking article and extending into connection with a transducer, the assembly being fluid filled so that pressure applied to the bulb will be transmitted to the transducer by means of the fluid in the assembly.

4. The invention in accordance with claim 3 wherein the fluid is water, the transducer is a low compliance pressure transducer, and the connecting tube includes a section of non-expandible needle tubing and a non-expandible flexible catheter mounted on one end of the needle tubing, the bulb being mounted on the other end of the needle tubing and being formed of rubber.

5. The invention in accordance with claim 4 wherein the pressure sensor assembly is bonded by adhesive affixed to the smoking article.

6. The invention in accordance with claim 5 wherein the elastomeric bulb is affixed to an elastomeric band adapted to removably engage with surfaces on the smoking article to facilitate use of the apparatus with a plurality of successive smoking articles.

7. The invention in accordance with claim 4 wherein the elastomeric bulb is approximately 1-2 mm in diameter and is adapted to contact a small approximately 2 mm diameter portion of the smoking article, the smoking article being a cigarette and the bulb contacting the cigarette approximately 7-9 mm from the filter tip, the needle tubing being 22 gage and the catheter being approximately 2 ft. in length and approximately 1 mm in inner diameter, the transducer being a low compliance ($10^{-9}$cm$^3$/dyne/cm$^2$) pressure transducer, and the transducer being amplified by a variable gain low-noise amplifier and displayed on an oscilliscope.

8. The invention in accordance with claim 1 wherein the means connected to the transducer to indicate the output of the transducer includes a signal conditioner and a low noise amplifier connected to an oscilliscope for providing a visual display output.

9. A method for testing pressure applied to a smoking article comprising; applying a pressure sensor to a predetermined portion of the smoking article to be subjected to external pressure, connecting a pressure transducer to the sensor, and indicating the output of the transducer responsive to the pressure applied to the smoking article and sensed by the sensor.

10. The invention in accordance with claim 9 wherein the pressure applied is one of smoker's lip pressure and filter, holder pressure.

11. The invention in accordance with claim 9 wherein the sensor includes an elastomeric bulb and a connecting tube assembly, the assembly being affixed to the smoking article and extending into connection with a transducer, the assembly being fluid filled so that pressure applied to the bulb will be transmitted to the transducer by means of the fluid in the assembly.

12. The invention in accordance with claim 11 wherein the fluid is water, the transducer is a low compliance pressure transducer, and the connecting tube includes a section of non-expandible needle tubing and a non-expandible flexible catheter mounted on one end of the needle tubing, the bulb being mounted on the other end of the needle tubing and being formed of rubber.

13. The invention in accordance with claim 12 wherein the pressure sensor assembly is adhesively affixed to the smoking article.

14. The invention in accordance with claim 12 wherein the elastomeric bulb is affixed to an elastomeric band adapted to removably engage with surfaces on the smoking article to facilitate use of the apparatus with a plurality of successive smoking articles.

15. The invention in accordance with claim 9 wherein the transducer output is indicated by a signal conditioner and a low noise amplifier connected to an oscilliscope for providing a visual display output.

* * * * *